(12) United States Patent
Tsubouchi et al.

(10) Patent No.: US 6,588,293 B2
(45) Date of Patent: Jul. 8, 2003

(54) HOLLOW RACK SHAFT

(75) Inventors: Akira Tsubouchi, Maebahshi (JP); Kiyoshi Okubo, Maebahshi (JP); Yasushi Watanabe, Maebahshi (JP)

(73) Assignee: NSK Ltd., Tokyo (JP)

( * ) Notice: Subject to any disclaimer, the term of this patent is extended or adjusted under 35 U.S.C. 154(b) by 35 days.

(21) Appl. No.: 09/832,449

(22) Filed: Apr. 10, 2001

(65) Prior Publication Data

US 2002/0026845 A1 Mar. 7, 2002

(30) Foreign Application Priority Data

Apr. 14, 2000 (JP) ........................... 2000-114340
May 18, 2000 (JP) ........................... 2000-145833

(51) Int. Cl.$^7$ ............................................. F16H 19/04
(52) U.S. Cl. ........................ 74/422; 74/498; 74/457
(58) Field of Search ........................ 74/422, 457, 498; 29/8

(56) References Cited

U.S. PATENT DOCUMENTS

| 3,717,017 A | * | 2/1973 | Vukovich | 29/893.32 |
| 4,249,749 A | * | 2/1981 | Collier | 108/145 |
| 4,367,060 A | * | 1/1983 | Berecz | 411/303 |
| 4,517,819 A | * | 5/1985 | Sandroni | 29/892 |
| 5,088,192 A | * | 2/1992 | Dempsey | 29/726.5 |
| 5,473,960 A | * | 12/1995 | Sakamoto et al. | 148/572 |
| 5,953,817 A | * | 9/1999 | Watanabe et al. | 29/890 |
| 6,000,267 A | * | 12/1999 | Yagi | 72/189 |

FOREIGN PATENT DOCUMENTS

| JP | 58-218339 A | | 12/1983 |
| JP | 05-345231 A | | 12/1993 |
| JP | 06-246379 A | | 9/1994 |
| JP | 408155574 | * | 6/1996 |
| JP | 11-180318 A | | 7/1999 |
| JP | 11-278287 A | | 10/1999 |
| JP | 2000202522 | * | 7/2000 |

* cited by examiner

Primary Examiner—David A. Bucci
Assistant Examiner—Julie K. Smith
(74) Attorney, Agent, or Firm—Sidley Austin Brown & Wood LLP

(57) ABSTRACT

A hollow rack shaft is produced by forming a plate work piece and has continuous metal flow along the contour of rack teeth surface without being cut. A series of wave-like concave-convex sections is formed on the inner surface of the shaft. Thickness of tooth body and tooth bottom of the rack teeth is adjusted by dimensions of the unevenness. Thereby, stress concentration at each point of the rack shaft is prevented and the shaft is strengthened and its weight reduced.

8 Claims, 8 Drawing Sheets

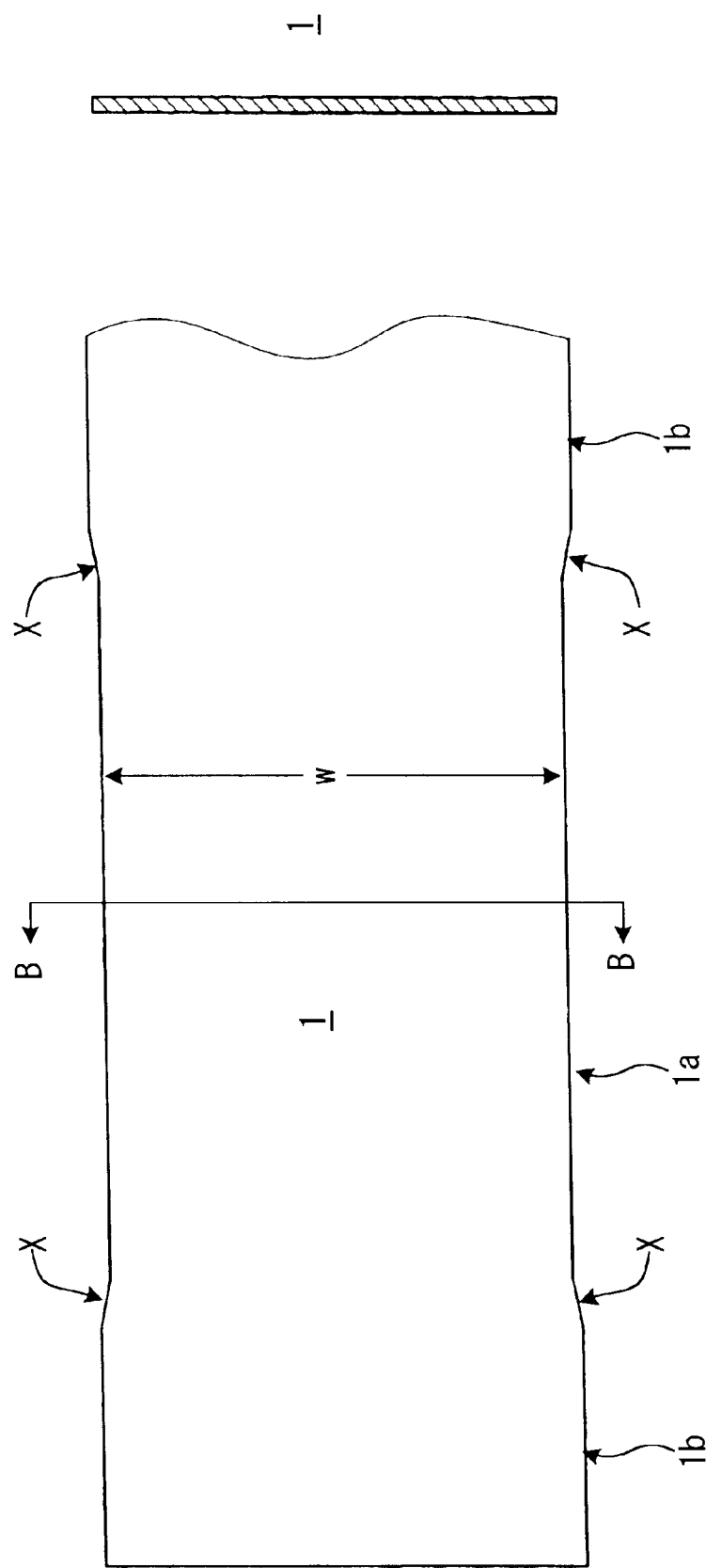

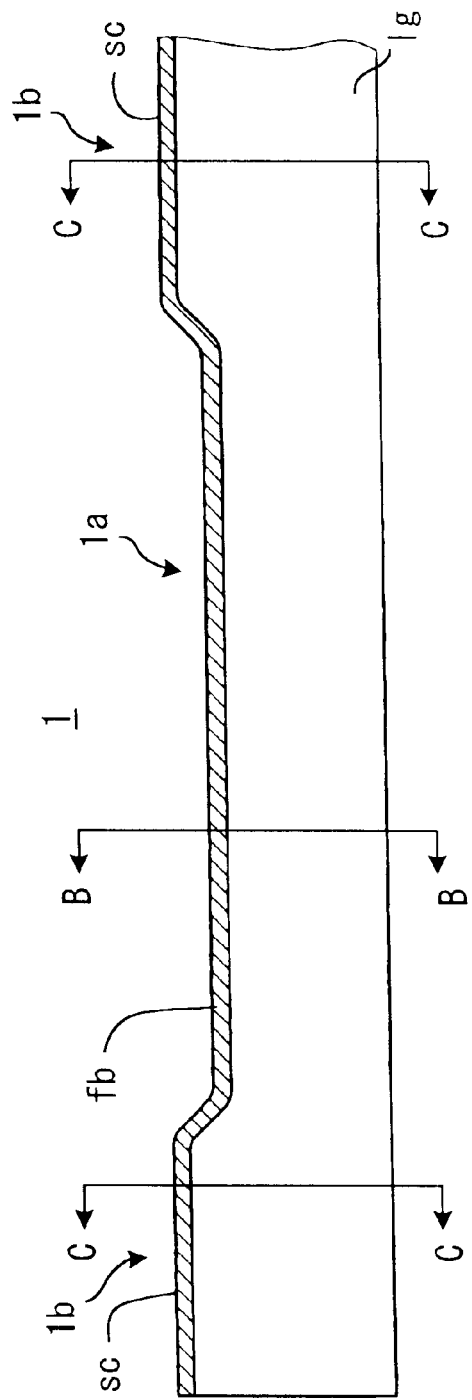
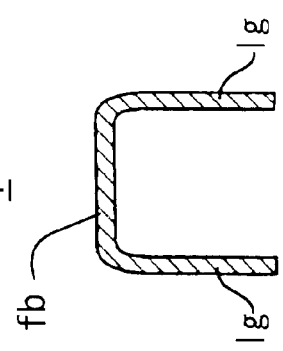

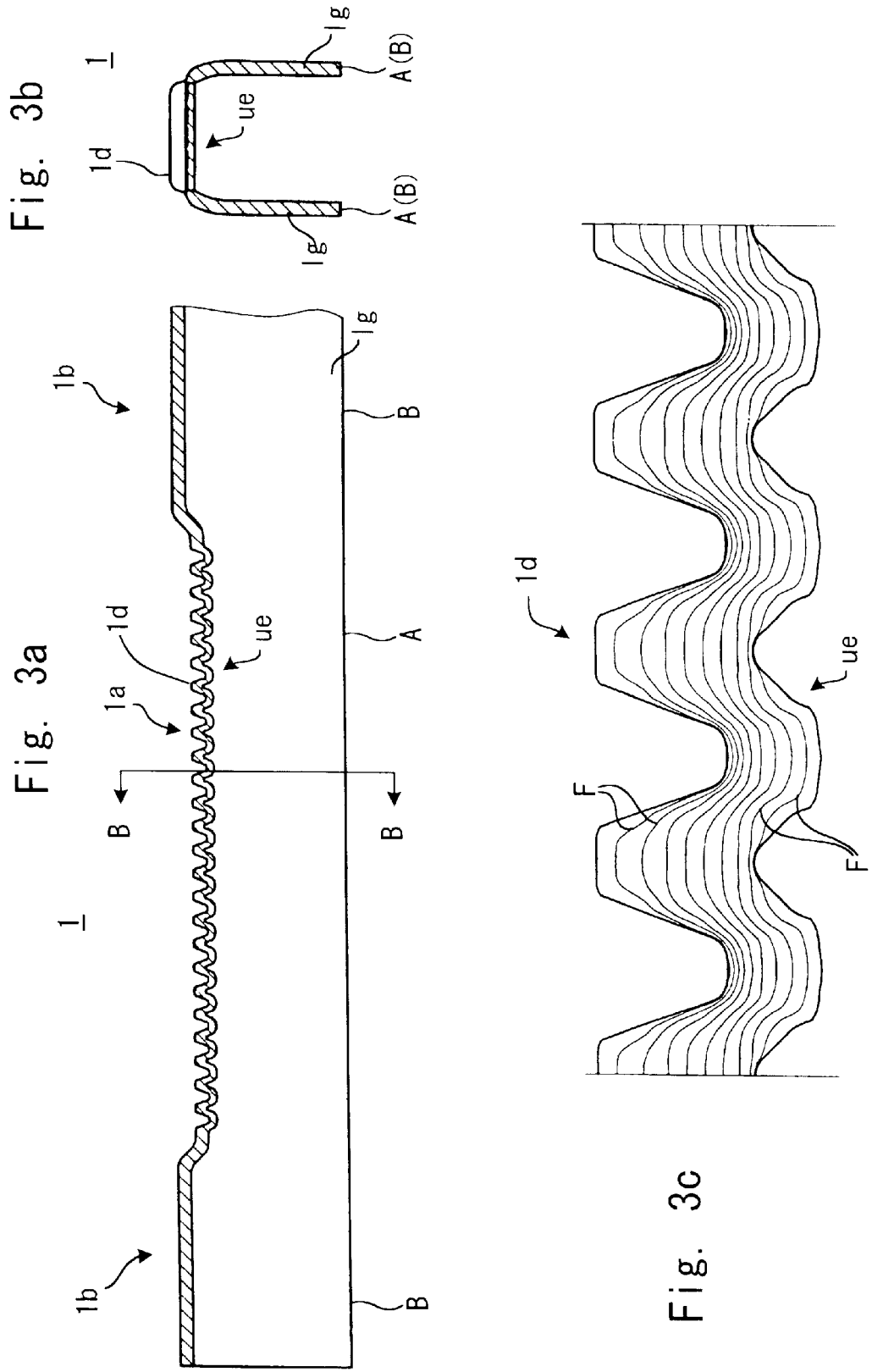

HOLLOW RACK SHAFT

This application is based on applications No. 2000-114340 and 2000-145833 filed in Japan, the contents of which are hereby incorporated for reference.

BACKGROUND OF THE INVENTION

1. Field of the Invention

This invention relates to a hollow rack shaft for a steering apparatus used in automobiles.

2. Description of the Related Art

A rack-and-pinion type steering apparatus is frequently used in automobiles. Rotation of the steering wheel by the driver is transmitted to a pinion meshed with a rack shaft. The rack shaft is connected to a steering rod for controlling the front wheels. The driver can therefore control the direction the automobile moves by rotating the steering wheel. The steering mechanism as described above is well known in the related art so further explanation is omitted here.

In the prior art, rack teeth have been obtained by gear cutting from a solid rod work piece. In the original steel bar for the workpiece, longitudinal metal flow is formed along the rolling direction. An anisotropy in strength between the direction parallel to the metal flow and the direction perpendicular to the metal flow occurs. The metal flow is cut off when the portions of the work piece are removed in the gear cutting process, therefore the rack teeth have low strength. So in order to obtain sufficient strength, the rack shaft has to be made larger, therefore, becomes heavier.

For reducing the weight of the rack shaft, a method is disclosed in Japanese Laid-Open Patent No. Hei 5-345231 for manufacturing a hollow rack shaft. In this method, a hollow rod material having sufficient thickness for gear cutting is prepared, and a portion of the wall of the hollow work piece is formed into a flat section by plastic deformation. Then, rack teeth are cut on the flat section. A cross section of the rack teeth produced by this manufacturing method is shown in FIG. 12. The teeth are formed by removing a portion of the material R, so that the metal flow F is cut off. In the above method (FIG. 12), it is not different from the prior art about an anisotropy in strength between the direction b parallel to the metal flow and the direction a (perpendicular to the metal flow), therefore the rack shaft must be large and heavy.

Another method for manufacturing rack shaft is disclosed in Japanese Laid-Open Patent No. Sho 58-218339 (Japanese Patent Publication No. Hei 4-28582). In this method, a hollow rod material is prepared and a flat section is formed on one portion of the surface by plastic deformation. Under the state that a mandrel is inserted into the hollow section, a die having teeth corresponding to the rack teeth is pressed onto the flat section to form the rack teeth. As the rack teeth are formed by plastic deformation in this method, the above-mentioned problem, i.e. cut of the metal flow F, does not occur. However, in this method, the work piece whose thickness (volume) is equal to the total volume of the rack teeth and the rack teeth bottom portion is required, thus the thickness except the rack teeth portion is unnecessarily thick. This causes a problem that the rack shaft could not be made sufficiently light.

Also, as shown in FIG. 13, the inner surface IS on the back side of the rack teeth is formed in a flat surface so that the metal flow F is sparse at sections RA of each tooth and are dense at the midsection of teeth, in other words, in the vicinity of the tooth bottom BA. A uniform strength could not be obtained since the density of the metal flows F is different at each portion. A cross sectional view of the same rack teeth is shown in FIG. 5. This figure shows the distribution of equi-stress lines when a load F is applied to one point f on the tooth surface (meshing surface with pinion). The equi-stress lines 4 in FIG. 5 appear densely on the front and back in the vicinity of the teeth bottom. The equi-stress lines 4 do not appear at other points, therefore it shows few changes in the stress. The portions where the equi-stress lines 4 are sparse hardly contribute to bear the load and are not essential for the rack shaft. These non-essential sections prevent the weight of the rack shaft from being reduced.

A manufacturing method for a hollow rack shaft conceived by Okubo, one of the inventors of the present invention, is disclosed in Japanese Patent Laid-Open 11-180318. In this method, a rectangular plate work piece is bent to a gutter-shaped member, and a rack teeth row formed on the flat center portion by plastic deformation, and the two leg portions of the gutter-shaped member are bent to butt against each other to produce a hollow rack shaft. In this method, the back surface of the rack teeth (surface forming the inner side of the hollow section in the future) IS, is formed with a series of wave-like concave-convex section corresponding to the rack tooth surface, unnecessary material do not remain and this method greatly contributes to reducing the weight of a rack shaft.

However, this Japanese Laid-Open Patent does not disclose how to optimize the uneven shape of the rack tooth back surface in order to prevent the stress concentration, nor what metal flow is optimum in the vicinity of the rack teeth.

SUMMARY OF THE INVENTION

An object of the present invention is to provide a hollow rack shaft with high strength and long service life by plastic forming a row of rack teeth without cutting metal flow at outer and inner surfaces of the hollow rack shaft.

Another object of the present invention is to provide a hollow rack shaft formed with a series of wave-like concave-convex sections on the inner surface. The stress concentration on the inner surface can be avoided and the stress is distributed equally. Therefore a hollow rack shaft with high strength and light weight can be provided. The hollow rack shaft in this invention is formed from a plate workpiece.

A hollow rack shaft according to the present invention is obtained by welding a gutter-shaped semi-circular (semi-tubular) upper half and a semi-circular lower half. The semi-circular upper half is formed with a row of rack teeth and is formed from a plate shaped work piece.

Inner surface of the hollow rack shaft according to the present invention has a series of wave-like concave-convex sections substantially corresponding to the rack tooth surface and the unevenness is provided with tooth wall thickness for uniformly distributing the tooth stress when a load is applied to the shaft. The hollow rack shaft of the present invention is defined by specified dimensions of portions on the cross section of the rack teeth row.

Other objects and advantages besides those described above, shall be apparent to those skilled in the art from the description of the preferred embodiments of th invention which follows. In the description, reference is made to the accompanying drawings, which form a part thereof, and which illustrate a working example of the invention. Such examples however, do not exhaustively cover the various embodiments of the invention, and reference is therefore made to the claims which follow the description for determining the scope of the invention.

BRIEF DESCRIPTION OF THE DRAWINGS

The accompanying drawings which are incorporated in and constitute a part of the specifications, illustrate the embodiments of the invention and along with the description, serve to explain the principles of the invention.

FIG. 1A is a frontal view of the original work piece used in the first embodiment of the invention.

FIG. 1B is a cross sectional view taken along line B—B of FIG. 1A.

FIG. 2A through FIG. 2C show the cross sectional views after the first process of the first embodiment is completed and are respectively, a frontal cross sectional view, a frontal cross sectional view taken along line B—B of FIG. 2A, and a cross sectional view taken along line C—C of FIG. 2A.

FIG. 3A through FIG. 3C show the cross sectional views of the work piece after the second process of the first embodiment is completed and are respectively, a frontal cross sectional view, a cross sectional view taken along line B—B of FIG. 3A, and an enlarged cross sectional view taken along line C—C of FIG. 3A.

DESCRIPTION OF THE PREFERRED EMBODIMENTS

Figure 4A:
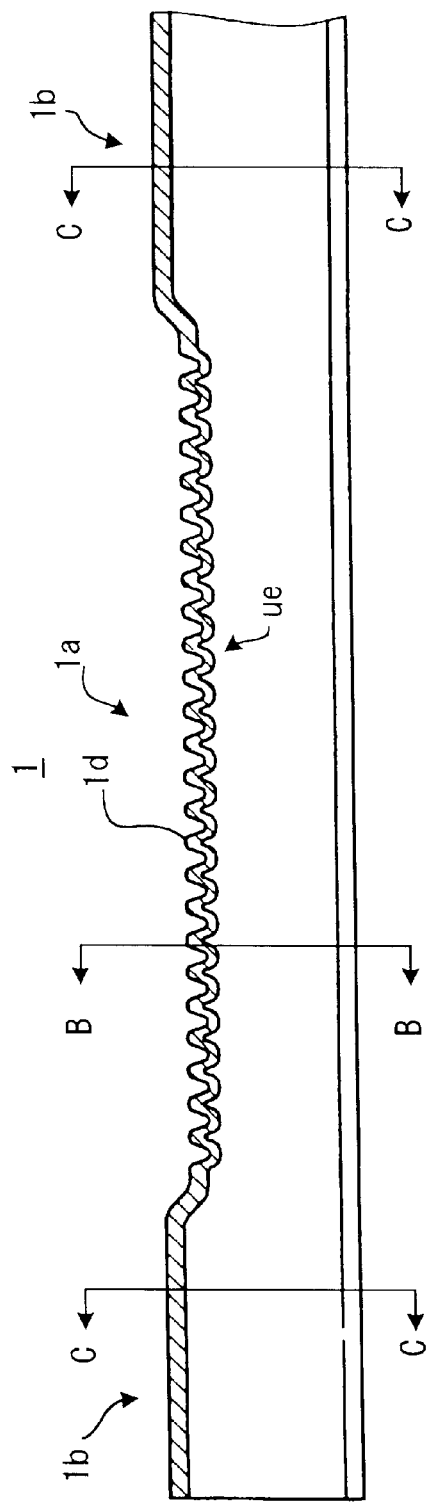
FIG. 4A through FIG. 4C show the cross sectional views of the work piece after the third process of the first embodiment is completed and respectively, are a frontal cross sectional view, a cross sectional view taken along line B—B of FIG. 4A, and a cross sectional view taken along line C—C of FIG. 4A.

The preferred embodiments of the invention are hereafter described while referring to the accompanying drawings.

FIG. 1A and FIG. 1B show the original work piece utilized in the first embodiment of the invention and respectively show a frontal view as well as a cross sectional view taken along line B—B of FIG. 1A. A substantially rectangular plate work piece cut out, by press blanking or laser cutting from a coil sheet metal, for example. For example, SCr, SCM capable of carburizing and quenching, or carbonized steel suitable for induction hardening can be utilized as the material. The width w of the work piece 1 in the zone 1a between the X and X sections shown by the arrows in FIG. 1A, is different from the width of the zone 1b on both sides. The zone 1a is for forming the rack teeth here. The width w is adjusted so that the material volume of zone 1a won't be over-volume or under-volume to the volume of zone 1b, when a series of forming process is completed.

FIGS. 2A through 2C show the cross sectional views of the work piece 1 after the first process is completed. FIG. 2A is a frontal cross sectional view. FIG. 2B is across sectional view taken along lines B—B of FIG. 2A. FIG. 2C shows a cross sectional view taken along lines C—C in FIG. 2A. In the first process, the work piece 1 is bent into a gutter shape having a flat bottom portion fb at the center, semi-circular (semi-cylindrical) portions sc extending from both of the longitudinal sides, and a pair of leg portions 1g extending from both of the lateral sides of them.

Next, in the second process, a row of rack teeth id are formed on the flat bottom fb. FIG. 3A through FIG. 3C show the cross sectional views of the work piece 1 after the second process is completed and the figures respectively show a frontal cross sectional view, a cross sectional view taken along lines B—B of FIG. 3A, and an enlarged fragmentary cross sectional view of FIG. 3A. In the second process, an upper die (not shown in drawing) having complementary surface on the rack teeth row 1d, and a lower die (not shown in drawing) with unevenness (convex/concave surfaces) corresponding to the unevenness on the surface of the upper die are utilized. Under the state that the work piece 1 is put between these dies, the upper and lower dies are approached each other, a row of rack teeth 1d is formed and the unevenness ue is formed on the back side by pressing the upper and lower dies onto the work piece.

In the rack teeth row manufactured by above, the metal flow F is deformed with keeping proper distance along the front surface and the back surface of the rack teeth row 1d as shown in FIG. 3C. What is remarkable in this invention is that there is no cutting off the metal flow as occurs by gear cutting by machining. Therefore, a hollow rack with strength is obtained.

Generally, it is very difficult to form a wave-like unevenness on the inner surface of a hollow work piece by inserting a mandrel having a complementary surface to the unevenness. Because the mandrel is necessary to be thin or slender enough to press into the hollow and therefore can not endure the lateral force for forming. In the present invention, the gutter-shaped work piece 1 has two legs opening outwards, so that the lower die can approach to the work piece from a perpendicular direction by passing through between the two legs 1g. The lower die can therefore have a simple structure and offers comparatively good freedom in the design process. Therefore, the shape or size of the lower die can be designed with optimal accuracy to satisfy the specification of the rack teeth row on the front surface. Further, the service life of the die can be extended since there is no need for complex movements. The effects that the shape or size of the unevenness exerts on the strength of the rack shaft is described later.

In rack shafts utilized in VGR (variable gear ratio) type steering devices, the pitch of the teeth changes along the axis of the rack shaft. This means that a volume of material at each point along the axis of the rack teeth row is changed and therefore it is difficult to form a row of rack teeth with precision without arch deformation. In the present invention, the shape and size of the unevenness of the lower die can be varied along the axis of the rack shaft so that the volume of material can be adjusted according to the axial position of the rack teeth. The present invention is also ideal for manufacturing the VGR rack shafts that are known to be difficult to form by plastic deformation in the method of the prior art.

Figure 4C:
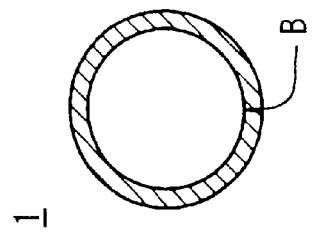
Figure 4B:
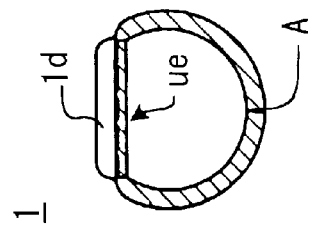

FIG. 4A through FIG. 4C show the cross sectional views of the work piece after the third process is completed. These figures respectively show a frontal cross sectional view, a cross sectional view taken along line B—B of FIG. 4A, and a cross sectional view taken along line C—C of FIG. 4A. In the third process, the two legs $1g$ are bend-formed into an arc, so the edges A and B butt each other. The legs $1g$ in zone $1b$ are bent into one full cylindrical shape along the bottom so formed in the first process, and the legs $1b$ in the zone $1a$ and the zone $1b$ form one continuous semicircle. The end A and the end B butting each other can be joined entirely or at some portions by means of, for example, laser welding. The strength of the finished hollow rack shaft can be greatly increased by this joint. The width w in zone $1a$ is adjusted beforehand so that the end A and the end B are bent and formed to mutually seal each other across the whole zone.

After the third process is completed, the rack teeth and other portion can be provided required strength, for example, by carburizing and quenching or induction hardening. Then, both ends are finished by grinding. Bending deformation also can be modified as required between each process.

Figure 5:
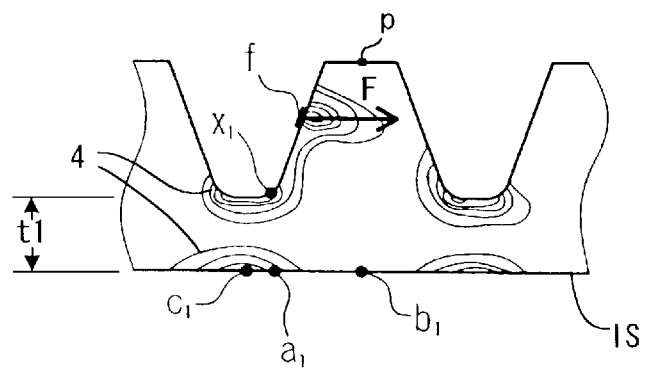
FIG. 5 is an enlarged cross sectional view overlapped the equi-stress lines on the rack teeth row of the first comparative example (prior art) 1.
Figure 6:
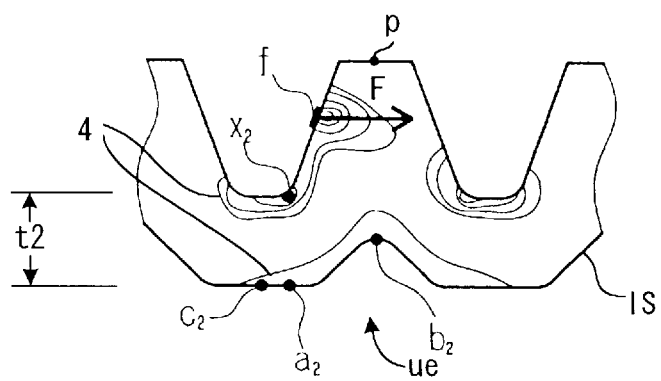
FIG. 6 is an enlarged cross sectional view overlapped the equi-stress lines on the rack teeth row of the embodiment 1 (first embodiment).
Figure 7:
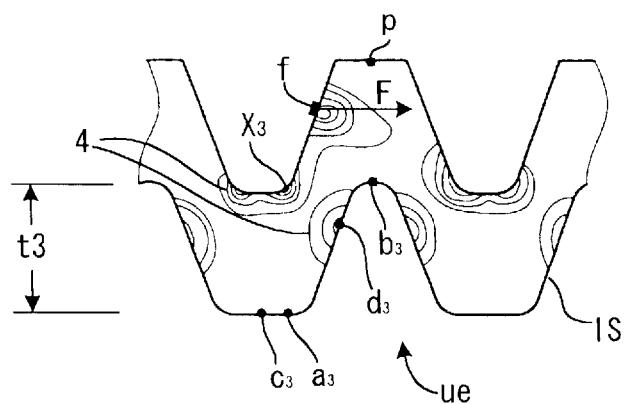
FIG. 7 is an enlarged cross sectional view overlapped the equi-stress lines on the rack teeth row of the second comparative example.

The effect that the shape or size of the unevenness exerts on the strength of the rack shaft is described hereafter. FIG. 5, FIG. 6 and FIG. 7 are enlarged cross sectional views of the rack teeth row portion and respectively show an example of a back of the rack teeth row not formed with unevenness, an example formed with a suitable unevenness and an example where the depth of the concave section is excessively deep. In these figures, the stress distribution (equi-stress lines) on the rack tooth row cross section is overlapped when a load F is applied by the meshing of one rack tooth with a pinion tooth at point f.

Points in these drawings are defined as follows: a bottom line of the rack tooth intersects a tooth surface line as point X; a line drawn from the point X perpendicular to the inner surface (opposite surface) IS intersects the inner surface IS as point a; point p is a middle point of the tooth top surface line; a line drawn from a middle point of the tooth bottom to the inner surface IS intersects the inner surface IS as point c and a line downwardly drawn from the point p intersects the inner surface IS as a point b, the point b being the top point of the concave surface curve in case that the concave is formed. The suffixes 1, 2 and 3 are respectively affixed as needed to the symbols corresponding to FIG. 5, FIG. 6 and FIG. 7, when needed.

In the rack shaft of the prior art (the first comparative example) as shown in FIG. 5, a maximum stress $\sigma$, appears at point X1 due to the load F. Stress having the relation $\sigma c1 > \sigma a2 > \sigma b1$ appears at points a1, b1 and c1 on the rack teeth back surface. The plate thickness of the tooth bottom is the thinnest compared to other sections if the rack teeth back surface IS is flat as in the prior art, and the stress tends to concentrate at the point c1, so that the point c1 is the weakest on the rack teeth back surface. Since stress in the vicinity of point b1 hardly appears, it is possible to say that the material in the vicinity of point b1 causes an unnecessary increase of the rack shaft weight. In the present invention, the material at points hardly sharing the stress is moved to locations sharing a greater amount of stress.

FIG. 6 shows an enlarged cross sectional view of the rack shaft according to the present invention, it shows that material is moved to more suitable location. As the result that a series of wave-like concave-convex section was provided by plastic deformation and material in the vicinity of point b1 was moved to the tooth bottom side containing point a1 and c1, the plate thickness at the tooth bottom was increased from t1 to t2. In this way, equi-stress lines are distributed sparsely in the vicinity of point X2, point a2 and point c2, and consequently stress $\sigma X2$, $\sigma a2$, and $\sigma c2$ at these points are lowered. Conversely, new equi-stress lines, which are not existent in the vicinity of point b1 of the prior art, appear in the vicinity of point b2 corresponding to point b1, and it is possible to say that the stress at point c2 is substantially equal to the stress at point a2. By shifting unneeded material to different locations in this way, a light weight rack shaft can be obtained without strength reduction.

Figure 8:
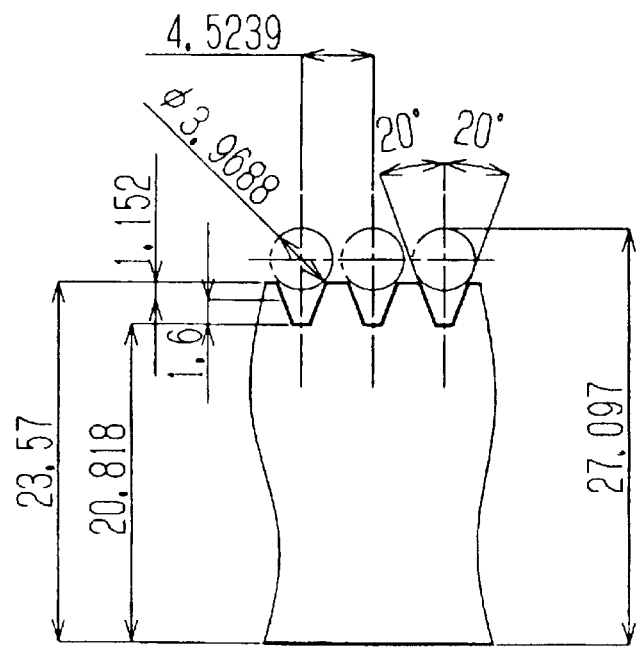
FIG. 8 is a descriptive drawing showing the external dimensions in millimeters of the rack teeth row in the finished rack shaft for the first embodiment, first comparative example and second comparative example.
Figure 9:
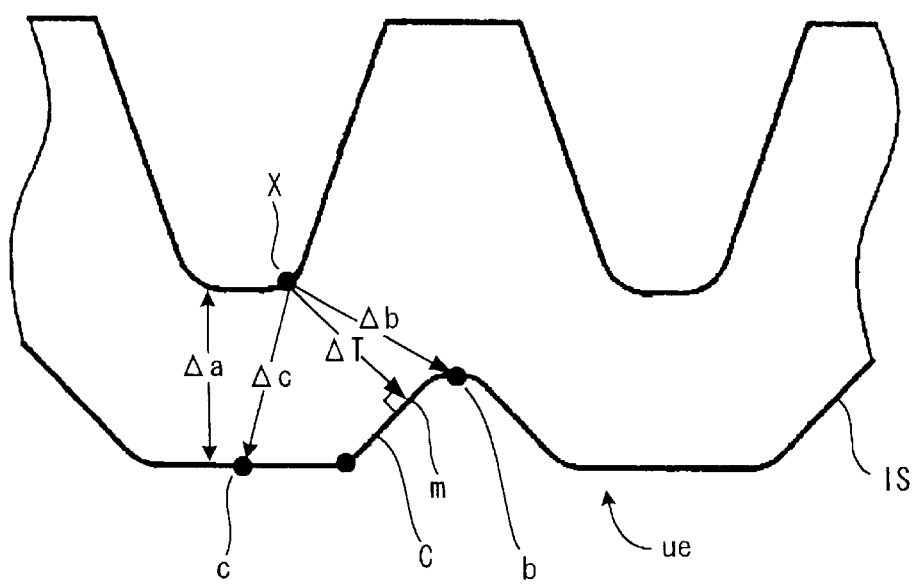
FIG. 9 is an enlarged cross sectional view of the rack teeth row and defines the various dimensions in the cross section.

FIG. 7 shows an enlarged cross sectional view of the rack shaft in which material is moved excessively. In this example, the tooth bottom thickness has been increased to t3, and no equi-stress line 4 appears at point a3 and point c3. Conversely, a stress concentrating point d3 appears on the back surface between point a3 and point b3. Therefore, material in the vicinity of point a3 and point c3 hardly share the stress, and an inappropriate amount of stress is applied to the point d3. In other words, when excessive material is moved like as this example, new stress concentration appears at a different point. FIG. 8 shows common dimensions in millimeters for the rack shafts shown in FIG. 5, FIG. 6 and FIG. 7. Numeral examples shown in these drawings are as follows (each dimension is referred to FIG. 9).

First Numeral Comparative Example

A hollow rack shaft is made using hollow work piece with a wall thickness of 3 millimeters and an outer diameter of 27 millimeters, to manufacture a rack shaft having the dimensions shown in FIG. 8 by a manufacturing method of the prior art (disclosed in Japanese Laid-Open Patent No. Sho 58-218339). The thickness t1 (FIG. 5) of the teeth bottom is t1=1.52 millimeters. The stress distribution is analyzed when a load $F=3$ $Kgf/mm^2$ is applied to the point f of the rack tooth meshing with pinion with the dimensions shown in FIG. 8. The results are shown below.

$\sigma X1 = 10.2\ Kgf/mm^2$ $\sigma c1 = 4.67\ Kgf/mm^2$ $\sigma b1 = 1.45\ Kgf/mm^2$ Since the stress $\sigma b1$ on the point b1 is extremely lower compared with the stress $\sigma c1$ at point c1, the material in the proximity of b1 hardly shares the stress, so the material in the proximity less contributes to structural strength.

Numeral Sample According to the Present Invention

In the embodiment sample of the invention (FIG. 6), the material of point b1, which hardly contributes to the structural strength as previously explained, is shifted to other locations including the high stress points a1 and c1. Dimensions of a series of wave-like concave-convex sections shown in the example of the invention are listed below (refer to FIG. 9 about each symbol).

$\Delta a2 = t2 = 1.80$ mm $\Delta b2 = 1.83$ mm $\Delta c2 = 1.83$ mm

The stress at each point, when a load F (=3 Kgf/mm$^2$) is applied based on the above dimensions, is analyzed. Results are as shown below.

$\sigma X2 = 8.0$ $Kgf/mm^2$ $\sigma b2 = 3.62$ $Kgf/mm^2$

Second Numeral Comparative Example

Dimensions of the unevenness shown in the second comparative example (Comparative Example 2) are listed below.

$\Delta a3 = t3 = 2.50$ mm $\Delta b3 = 1.78$ mm $\Delta c2 = 2.64$ mm

The stress at each point, when a load F (=3 Kgf/mm$^2$) is applied to the point f, is analyzed. Stress concentration point, which hasn't been existed, appears at point d3 between point a3 and point b3. Results are as shown below.

$\sigma X3 = 10.9$ $Kgf/mm^2$ $\sigma de = 6.53$ $Kgf/mm^2$

The following conclusions were obtained as comparing these three samples. The stress distribution in the vicinity of the rack tooth back surface is the most uniform in the embodiment sample according to the present invention. The stress $\sigma X2$ at point X2 in the embodiment sample according to the present invention is smaller than the stress $\sigma X1$ in the comparative example 1 and the stress $\sigma X3$ in the comparative example 2.

Results of various tests revealed that stress does not concentrate at point c, that stress $\sigma X$ is smaller than in other cases, and that stress concentration does not appear at point d3 in the concave section in the following cases:

when the hollow rack shaft has an inner surface having a series of wave-like concave-convex section along the rack teeth row and, the unevenness ue are formed with a tooth bottom so that the stress is uniformly distributed when a load is applied on the rack teeth;

when the length $\Delta c$ of the line drawn from point X to point c is substantially equivalent to the length $\Delta b$ of the line drawn from point X to point b;

when a perpendicular line drawn from point X to the curve C forming the concave of the unevenness ue passes through point m forming a straight line; and, when the $\Delta c$ is within a range such that $0.9 \times \Delta b \leq \Delta c \leq 1.1 \times \Delta b$.

For forming the teeth which has an uneven back surface, it is required that the lower die can approach perpendicularly to the upper die. This means that a hollow rack shaft having an unevenness surface can be produced from the work pieces which are different shape from what is disclosed in the first embodiment if only the upper and lower dies can approach perpendicularly each other. The second and the third embodiments according to the above idea are as follows:

Second Embodiment

Figure 10:
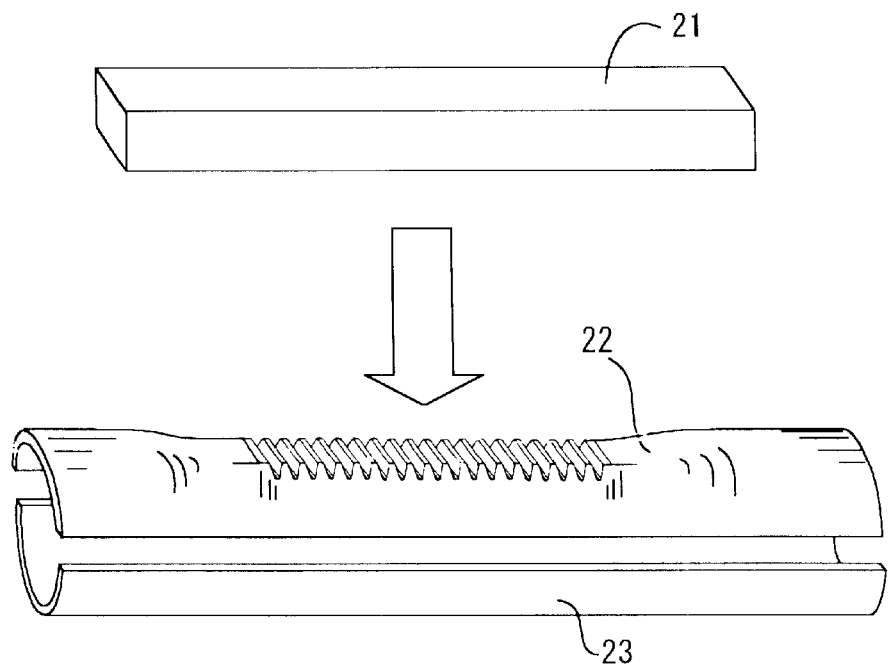
FIG. 10 is a perspective view showing the method for manufacturing the hollow rack shaft of the second embodiment.

FIG. 10 is a perspective view for describing in a simple manner the method for manufacturing a hollow rack shaft utilizing plural work pieces. In the first process, an upper gutter-like work piece 22 with rack teeth to comprise upper half (rack teeth side) of the hollow rack shaft is formed from a solid cuboid work piece 21 or a plate work piece. The gutter-shaped work piece 22 is essentially the same as that of the first embodiment except for the difference of the leg length. The lower die approaches from between the two open legs, and as related above, the unevenness ue are formed on the surface IS on the back of the rack teeth row. In the second process of this embodiment, a semicircular lower gutter-like work piece 23 formed from cuboid work piece 21 or a plate work piece, is welded to the upper gutter-like work piece 22. The welded section and both ends are then finished by grinding.

In this embodiment, the two gutter-shaped work pieces are welded at approximately symmetric positions above and below, so that welding distortion is not prone to occur, there is also little necessity for straightening and even if required, the amount of straightening correction is small.

Third Embodiment

Figure 11:
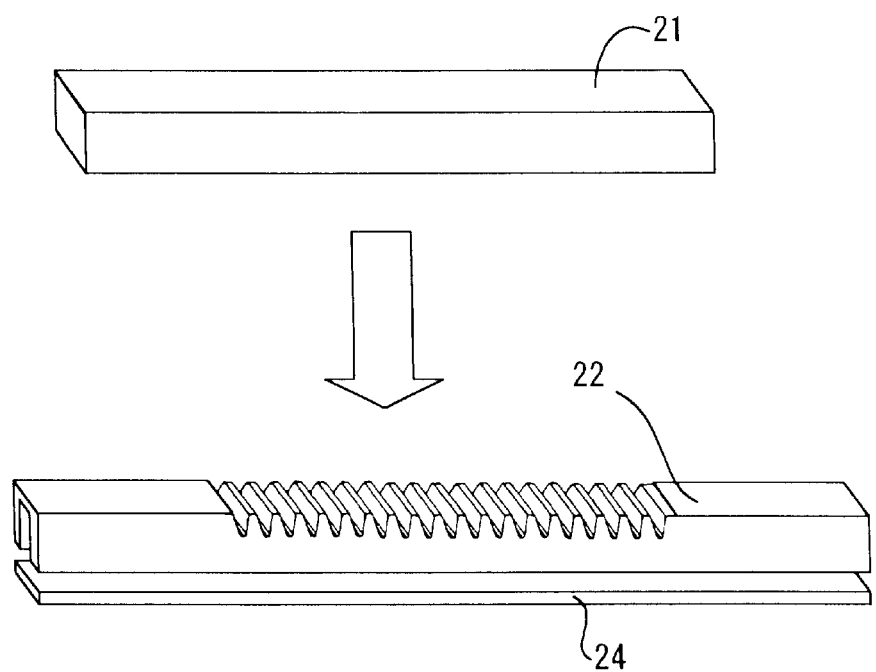
FIG. 11 is a perspective view showing a method for manufacturing a hollow rack shaft of the third embodiment.
Figure 12:
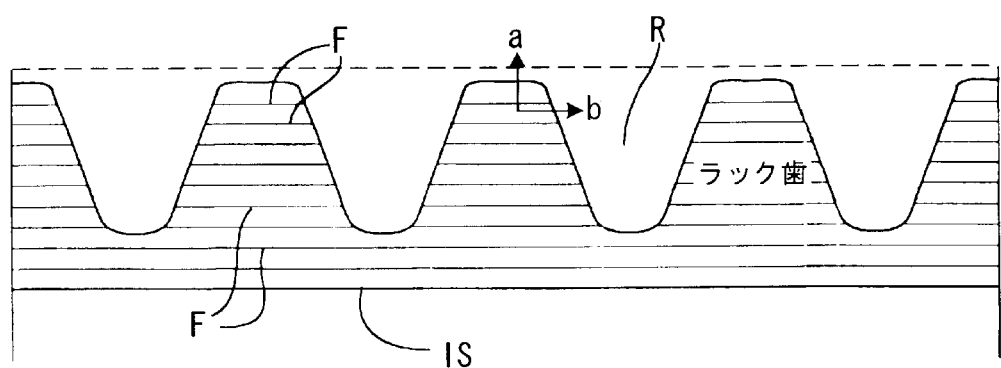
FIG. 12 is a cross sectional view of the rack teeth row manufactured by the method of the prior art.
Figure 13:
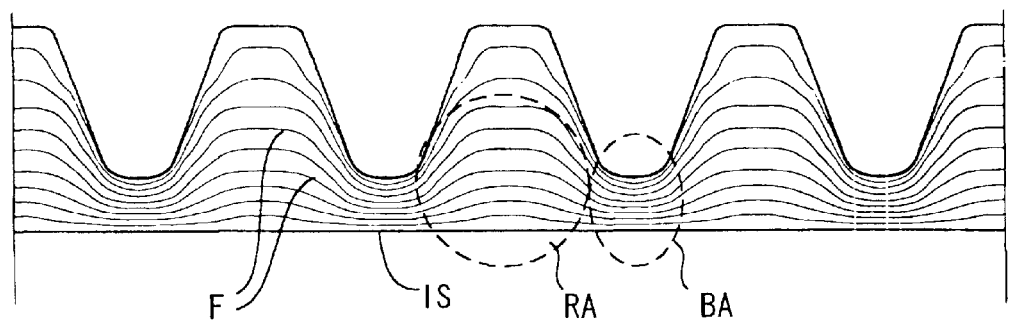
FIG. 13 is a cross sectional view of the rack teeth row manufactured by another method of the prior art.

FIG. 11 is a perspective view for showing in a simple manner another method for manufacturing a hollow rack shaft utilizing plural work pieces. A four-cornered hollow rack shaft is shown because a circular shape is not always required for both ends of the hollow rack shaft. In the first process, an upper gutter-like work piece 22 with rack teeth to comprise the upper half (rack teeth side) of the hollow rack shaft is formed from a solid cuboid work piece 21 or a plate workpiece. The gutter-like work piece 22 is essentially the same as that of the first embodiment and the gutter-like work piece of the second embodiment except for the difference of the leg length, and as previously described, the lower die approaches through between the two open legs, and the unevenness ue are formed on the surface IS on the back of the rack teeth row. In the second process of this embodiment, a separately prepared lower plate piece 24 is welded to the gutter-like work piece 22. The welded section and both ends are then finished by grinding.

In the invention as described utilizing the above embodiments, a hollow rack shaft having a row of rack teeth completely formed from the inner surface to the outer surface is produced by plastic deformation. Thereby, the metal flow is not broken or cut and uniformly distributed. Therefore, a hollow shaft with high strength and a long service life can be provided.

Also the hollow rack shaft in the present invention, which is formed a series of wave-like concave-convex section on the inner surface of the rack teeth, can prevent stress concentration. As the reason above, the stress is uniformly distributed in whole portions, therefore, a hollow rack shaft with improved strength and light weight can be provided.

Although only the preferred embodiments of the invention were specifically illustrated and described herein, it will be understood by one skilled in the related art that many modifications and variations of the present invention are possible in view of the above knowledge and within the purview of the appended claims without departing from the spirit and intended scope of the invention.

What is claimed is:

1. A hollow rack shaft comprising:
   a gutter-shaped upper half having a row of rack teeth and a gutter-shaped semi-cylindrical lower half;
   wherein said gutter-shaped upper half and said gutter-shaped semi-cylindrical lower half are welded to each other, and
   wherein said hollow rack shaft has metal flow substantially uniformly continuing along a contour of a rack teeth row of said hollow rack shaft without being cut at outer and inner surfaces of said rack teeth.

2. A hollow rack shaft according to claim 1, wherein each of said gutter-shaped upper half and said gutter-shaped semi-cylindrical lower half are respectively made by forming a plate work piece.

3. A hollow rack shaft for use in automotive steering mechanisms having an inner surface with a series of wave-like concave-convex sections substantially corresponding to the outer tooth surface, wherein said inner surface is provided with tooth wall thickness for uniformly distributing tooth stress when a load is applied to said hollow rack shaft;
   wherein a length $\Delta c$ of a line drawn from a point X of said rack tooth root to a point c fallen from a middle point of tooth bottom perpendicular to a straight line of said convex surface is substantially equivalent to a length $\Delta b$ of a line drawn from said point X to a middle point b of said concave surface.

4. A hollow rack shaft according to claim 3, wherein a perpendicular line drawn from a point X to a curve C forming said concave intersects at a point on a substantial straight line portion of said curve C.

5. A hollow rack shaft according to claim 4, wherein the length $\Delta c$ is within a range from 0.9 to 1.1 times the length $\Delta b$.

6. A hollow rack shaft comprising:
   a hollow shaft having an outer surface provided with an outer tooth surface and an inner surface provided with a series of wave-like concave-convex sections substantially corresponding to the outer tooth surface;
   wherein said inner surface is provided with tooth wall thickness adapted to uniformly distribute tooth stress when a load is applied to said hollow rack shaft; and
   wherein a length $\Delta c$ of a line drawn from a point X on said rack tooth root to a point c fallen from a middle point of tooth bottom perpendicular to a straight line of said convex surface is substantially equivalent to a length $\Delta b$ of a line drawn from said point X to a middle point b of said concave surface.

7. A hollow rack shaft according to claim 6, wherein a perpendicular line drawn from a point X to a curve C forming said concave intersects at a point on a substantially straight line portion of said curve C.

8. A hollow rack shaft according to claim 7, wherein the length $\Delta c$ is within a range from 0.9 to 1.1 times the length $\Delta b$.

\* \* \* \* \*